US008626778B2

(12) United States Patent
Wilkes et al.

(10) Patent No.: US 8,626,778 B2
(45) Date of Patent: Jan. 7, 2014

(54) SYSTEM AND METHOD FOR CONVERSION OF JMS MESSAGE DATA INTO DATABASE TRANSACTIONS FOR APPLICATION TO MULTIPLE HETEROGENEOUS DATABASES

(75) Inventors: Stephen Wilkes, Santa Clara, CA (US); Michael Scott Nielsen, San Francisco, CA (US); Codin Pora, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 13/076,253

(22) Filed: Mar. 30, 2011

(65) Prior Publication Data

US 2012/0023116 A1 Jan. 26, 2012

Related U.S. Application Data

(60) Provisional application No. 61/367,323, filed on Jul. 23, 2010.

(51) Int. Cl.
*G06F 17/00* (2006.01)

(52) U.S. Cl.
USPC ............. 707/756; 707/736; 707/758; 706/12; 706/14; 715/200

(58) Field of Classification Search
None
See application file for complete search history.

(56) References Cited

U.S. PATENT DOCUMENTS

| | | | |
|---|---|---|---|
| 6,687,848 B1 * | 2/2004 | Najmi | 714/4.4 |
| 6,753,889 B1 * | 6/2004 | Najmi | 715/784 |
| 6,877,023 B1 * | 4/2005 | Maffeis et al. | 709/202 |
| 7,031,987 B2 | 4/2006 | Mukkamalla et al. | |
| 7,039,773 B2 | 5/2006 | Hu et al. | |
| 7,299,230 B2 * | 11/2007 | Liou et al. | 1/1 |
| 7,571,173 B2 | 8/2009 | Yang et al. | |
| 8,224,834 B2 * | 7/2012 | Akaboshi | 707/759 |
| 2002/0169842 A1 * | 11/2002 | Christensen et al. | 709/206 |
| 2002/0174340 A1 * | 11/2002 | Dick et al. | 713/178 |
| 2004/0148585 A1 * | 7/2004 | Sengodan | 717/101 |
| 2004/0254919 A1 | 12/2004 | Giuseppini | |
| 2005/0253739 A1 | 11/2005 | Hu | |

(Continued)

FOREIGN PATENT DOCUMENTS

WO 2007134250 A2 11/2007

OTHER PUBLICATIONS

"Oracle GoldenGate-An overview", Alex Blyth, Jul. 2010.*

(Continued)

*Primary Examiner* — Hung Le
(74) *Attorney, Agent, or Firm* — Fliesler Meyer LLP

(57) ABSTRACT

A system and method for performing real-time conversion of data which is present in the form of messages on JMS-compliant or other messaging systems into database transactions, which can then subsequently be applied to multiple heterogeneous databases or other systems. In accordance with an embodiment, the invention provides a means by which data can be read from messages, and converted to a set of database operations that are then stored as a persistent trail file (for example, as an Oracle GoldenGate trail file). The operations, as recorded in the trail file, can then be routed via a network and applied to target systems as required. In accordance with an embodiment, the data can be read in real-time from the messaging system, and written out as quickly as it can be consumed to the persistent trail files.

17 Claims, 3 Drawing Sheets

(56) References Cited

U.S. PATENT DOCUMENTS

| | | | |
|---|---|---|---|
| 2006/0212356 A1 | 9/2006 | Lambert et al. | |
| 2007/0299885 A1* | 12/2007 | Pareek et al. | 707/202 |
| 2008/0077601 A1* | 3/2008 | Liou et al. | 707/100 |
| 2009/0106327 A1 | 4/2009 | Dilman et al. | |
| 2009/0313311 A1 | 12/2009 | Hoffmann et al. | |
| 2010/0191884 A1 | 7/2010 | Holenstein et al. | |
| 2011/0029681 A1* | 2/2011 | Lee et al. | 709/230 |
| 2011/0179011 A1 | 7/2011 | Cardno et al. | |
| 2011/0307524 A1 | 12/2011 | Aitken et al. | |
| 2012/0030165 A1 | 2/2012 | Guirguis et al. | |
| 2012/0030172 A1 | 2/2012 | Pareek et al. | |
| 2012/0295716 A1* | 11/2012 | Lee et al. | 463/42 |

OTHER PUBLICATIONS

"Oracle GoldenGate: Architecture for Real-Time Replication", Jan. 2010.*

"Oracle GoldenGate", Oracle Data Sheet, Sep. 2009.*

"Oracle Technology Overview", Jun. 2010.*

Louis, Oracle GoldenGate: Architecture for Real-Time Replication, Jan. 2010, 69 pages, Oracle International Corporation.

Unknown Author, Oracle GoldenGate, Oracle Data Sheet, Sep. 2009, 4 pages, Oracle International Corporation.

Blyth, Oracle GoldenGate—An Overview, Jul. 2010, 58 pages, Oracle International Corporation.

Unknown Author, Oracle Technology Overview, Jun. 2010, 30 pages, Oracle International Corporation.

Guirguis, et al., "BronzeGate: Real-time Transactional Data Obfuscation for GoldenGate," 2010, Proceeding EDBT '10 Proceedings of the 13th International Conference on Extending Database Technology, pp. 645-650.

Soorma, GoldenGate Tutorial 1—Concepts and Architecture, Feb. 18, 2010, 4 pages. Relevant pages: whole document.

Oracle International Corporation, Oracle GoldenGate Administrative Guide, Version 10.4, Oct. 2009, 343 pages. Relevant pp. 13, 14, 16 and 333-337, Fig. 2.

Unknown Author, MySQL 5.0 Reference Manual Achieved version from Apr. 1, 2010, Jan. 4, 2010, 3 pages. Relevant pages: whole document.

International Searching Authority, International Search Report and Written Opinion for PCT International Patent Application No. PCT/US2011/036508, Feb. 18, 2013, 10 pages.

* cited by examiner

# US 8,626,778 B2

SYSTEM AND METHOD FOR CONVERSION OF JMS MESSAGE DATA INTO DATABASE TRANSACTIONS FOR APPLICATION TO MULTIPLE HETEROGENEOUS DATABASES

CLAIM OF PRIORITY

This application claims the benefit of priority to U.S. Provisional Patent Application No. 61/367,323, titled "SYSTEM AND METHOD FOR CONVERSION OF JMS MESSAGE DATA INTO DATABASE TRANSACTIONS FOR APPLICATION TO MULTIPLE HETEROGENEOUS DATABASES", filed Jul. 23, 2010; which application is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention is generally related to transferring data between different systems, and is particularly related to a system and method for performing real-time conversion of data present in the form of messages on JMS-compliant messaging systems into database transactions, which can subsequently be applied to multiple heterogeneous databases.

BACKGROUND

A common data integration problem is the need to apply data transactions that occur in a first system, at a second, perhaps totally different, system, whilst preserving the transactional semantics of the data. Oftentimes, the operations belonging to particular transactions need to be applied either entirely or partially as soon as possible after the original transaction has completed (i.e. in real-time). In some environments, messages representing a change to an original data are placed on a messaging system and/or a message queue by an application at the first system. Generally, in order to perform a similar operation at a second system (e.g. a database), custom software code must be developed to read the data from the message queue, and apply it as appropriate to the second system). Problems can occur if the second system is not known a priori, or if the transaction needs to be recovered, since there is no means to restore data from messages that have already been consumed. Certain systems would benefit from such integration, but no real-time means is currently available. This is the general area that embodiments of the invention are intended to address.

SUMMARY

Described herein is a system and method for performing real-time conversion of data which is present in the form of messages on JMS-compliant or other messaging systems into database transactions, which can then subsequently be applied to multiple heterogeneous databases or other systems. In accordance with an embodiment, the invention provides a means by which data can be read from messages in a messaging system, and converted to a set of database operations that are then stored as a persistent trail file (for example, as an Oracle GoldenGate trail file). The operations, as recorded in the trail file, can then be routed via a network and applied to target systems as required, for example to maintain a replicated set of information at one or more different or heterogeneous systems. The data in the message can be formatted in a variety of ways, for example, as fixed width, delimited, or XML data, and the system can be configured to convert this data as appropriate. In accordance with an embodiment, the data can be read in real-time from the messaging system, and written out as quickly as it can be consumed to the persistent trail files. In scenarios where there is no current means of integration of two systems, the invention can be used as a bridge if, for example, the source system is modified or configured to write data changes to a messaging system, and Oracle GoldenGate is used as a means of delivery to the target system. Embodiments of the invention address the problem of propagating transactions from a message queue to a target system in real-time, do not require custom programs to be developed that are specific to each target database system, and provide a way to retransmit transactions in failure scenarios.

DETAILED DESCRIPTION

Described herein is a system and method for performing real-time conversion of data present in the form of messages on JMS-compliant messaging systems into database transactions which can subsequently be applied to multiple heterogeneous databases. Advantages of the solution include that it operates in real-time, providing the ability to integrate changes from one system to another as they occur with very little latency; provides flexible conversion options that allow the system to read a variety of formats of source messages, including XML, fixed width and delimited data, and have complete control on how those messages are converted into equivalent database operations; supports persistent storage of operations in a trail file and enables operations to be replayed into target systems should the target system need to be recovered from an earlier point in time; enables messages to be read from the queue in a transactional fashion and transaction semantics are embedded in the resultant trail; works out-of-the-box without any custom coding requirements to read messages and convert to operations in a trail; and, once the message queue data has been converted to trail files, can be applied to other heterogeneous databases.

Figure 1:
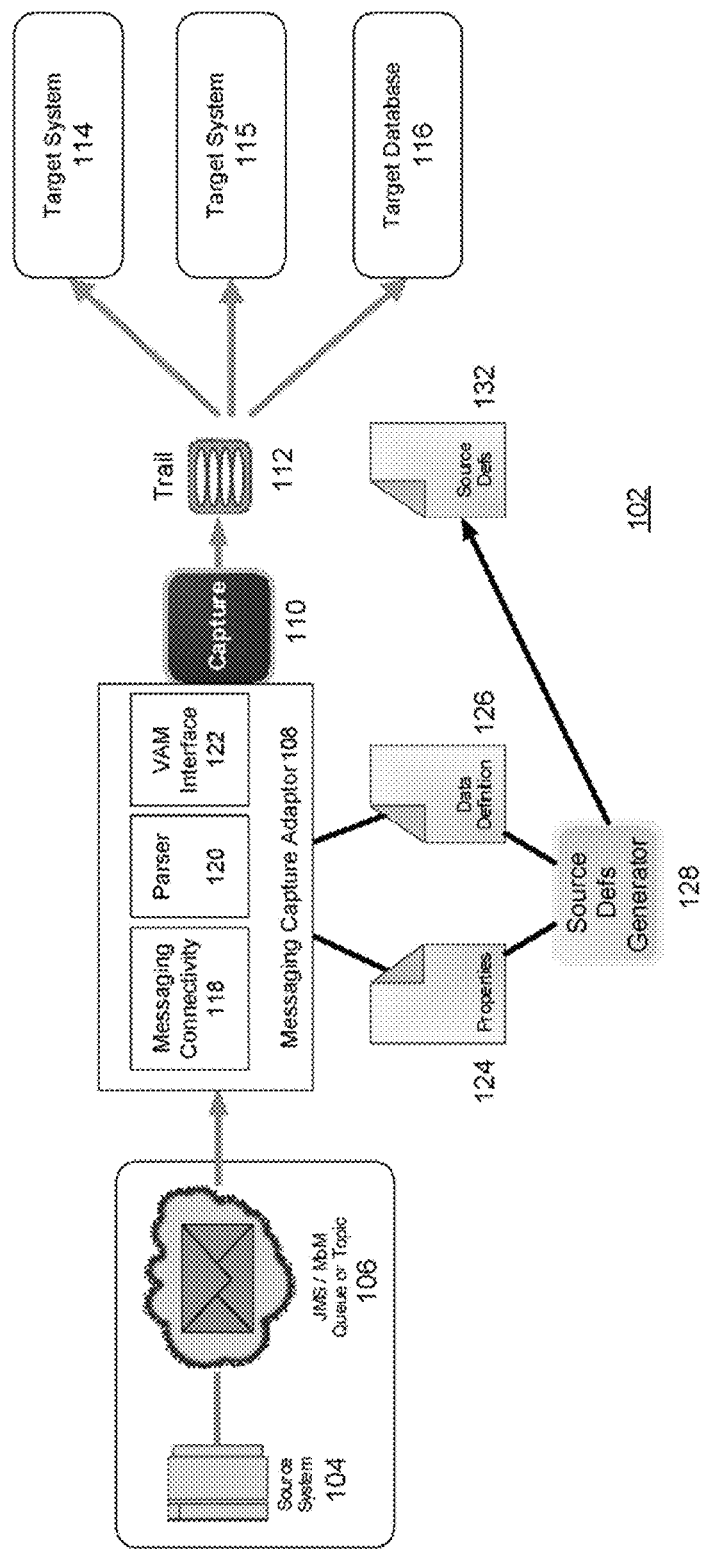
FIG. 1 is an illustration of the overall architecture of a system for conversion of JMS message data into database transactions, in accordance with an embodiment.

FIG. 1 is an illustration of the overall architecture of a system for conversion of message data into database transactions, in accordance with an embodiment. As shown in the architecture 102 of FIG. 1, the system comprises a messaging capture adaptor 108, which provides for conversion and communication of data from one or more source systems 104, which in turn include or are associated with one or more messaging systems or messaging queues 106. In accordance with an embodiment, a Java Message Service (JMS) system can be used, although other types of Message-oriented Middleware (MoM) or messaging system can be similarly used. As data changes occur at the source system, information about those data changes can be placed on an appropriate message queue and/or message topic, for subsequent retrieval.

In accordance with an embodiment, the messaging capture adaptor can be provided as an extension to a data capture and replication system or product 110, for example as an extension to the Oracle GoldenGate product which enables extraction and replication of data in the form of trail information or trail files 112 from a first database or transaction system to a second database or transaction system.

At runtime, while the source system operates, messages are placed onto queues or topics corresponding to changes in the data at the source system, and using standard, e.g. JMS techniques for placing messages onto such queues. Depending on the particular implementation and user's preferences, an existing queue or topic can be used, or alternately a new queue or new topic can be configured for use in the replication process. The choice between using a queue or topic can also vary with the particular implementation and user preference, generally a queue will provide a 1:1 association between a message provider and a message queue subscriber, while a topic will allow for 1:N associations between a message provider and multiple N topic subscribers.

In accordance with an embodiment, the messaging capture adaptor retrieves messages from the configured queues or topics, similarly using standard, e.g. JMS techniques for retrieving messages from such queues, converts the messages, and provides them as an output to the data capture and replication system or product. The extract process can then be used to generate a trail containing the processed data, which trail can be fed to other systems 114, 115, or and/or databases 116.

In accordance with an embodiment, the messaging capture adaptor can be provided as a Vendor Access Module (VAM) plug-in or application program interface (API) to the data capture and replication system or product. A set of properties 124, rules, and external files and definitions 126 can be used to provide messaging connectivity information, and to define how the messages are to be parsed and mapped to records in the target trail.

In accordance with an embodiment, the messaging capture adaptor comprises three major components: a messaging connectivity component 118; a data parsing component 120; and a VAM Interface component or API 122. It will be evident that in accordance with other embodiments, different arrangements and other types of components, features, coding or logic, can be used to provide similar functionality.

Messaging Connectivity Component

In accordance with an embodiment, all messaging connectivity is provided through, e.g. a generic JMS interface. The JMS connectivity can be configured through property files, in a similar way to existing Java delivery components, that allow the following to be set: the Java classpath for the JMS client; a JMS source destination (queue or topic) name; JNDI connection properties, such as standard JNDI connection properties for Initial Context, connection factory JNDI name, and destination JNDI name; and Security information, such as JNDI authentication credentials, and JMS connection username and password.

In accordance with an embodiment, the messaging capture adaptor can connect to the messaging provider on start-up; the 'extract' process can be configured to automatically restart using standard 'manager' autorestart parameters in the event of any connectivity related errors during processing.

In accordance with an embodiment, the messaging capture adaptor supports JMS text messages. When asked by the messaging capture adaptor for the next message, the messaging connectivity component: starts a local JMS transaction if not already started; reads a message off the queue; if no message exists returns end-of-file; and otherwise returns the contents of the message and any message header properties to the messaging capture adaptor. Once the messaging capture adaptor has successfully parsed the message, has output an entire transaction to a trail, and ensured the transaction has been flushed to disk, the messaging connectivity component commits the JMS local transaction, removing the messages from the queue or topic. In the event of any error this local transaction can be rolled back, leaving the unprocessed messages on JMS server.

In accordance with an embodiment, JMS properties obtained from the header are available as values in all parsers when specified in the properties file in the form $JMSProperty.

Data Parsing Component

In accordance with an embodiment, the messaging capture adaptor provides one or more of: fixed width message parsing delimited message parsing XML message parsing In order to parse the data and translate it to Oracle GoldenGate records, the data parsing component needs to be provided with the source and target formats of the data, and rules to translate from the source to the target. The mechanisms used to provide this information are parser dependent.

In accordance with an embodiment, a separate utility 128 can be provided to generate a sourcedefs file 132 that is based on the data definition and parser properties. Since the trail may be stored in the form of binary data in a trail file, the sourcedefs file allows another system or product to decipher its contents.

VAM Communications Component/Interface Component

In accordance with an embodiment, the VAM plug-in or application program interface (API) provides a read interface that can invoked through a standard Oracle GoldenGate extract parameter file as is demonstrated in the following sample:

```
add extract <extname>, VAM
add extttrail ./dirdat/aa, extract <extname>, megabytes 100
```

In accordance with an embodiment, the messaging capture adaptor can be provided as a shared library (for example as a .so or .dll file) that integrates into the dataflow via, e.g. the GoldenGate extract process. In accordance with these embodiments, the separate utility can use the same properties file as the messaging capture adaptor, reading in properties and any parser specific data definition, and creating a GoldenGate sourcedefs file to be used by an Oracle GoldenGate product.

Figure 2:
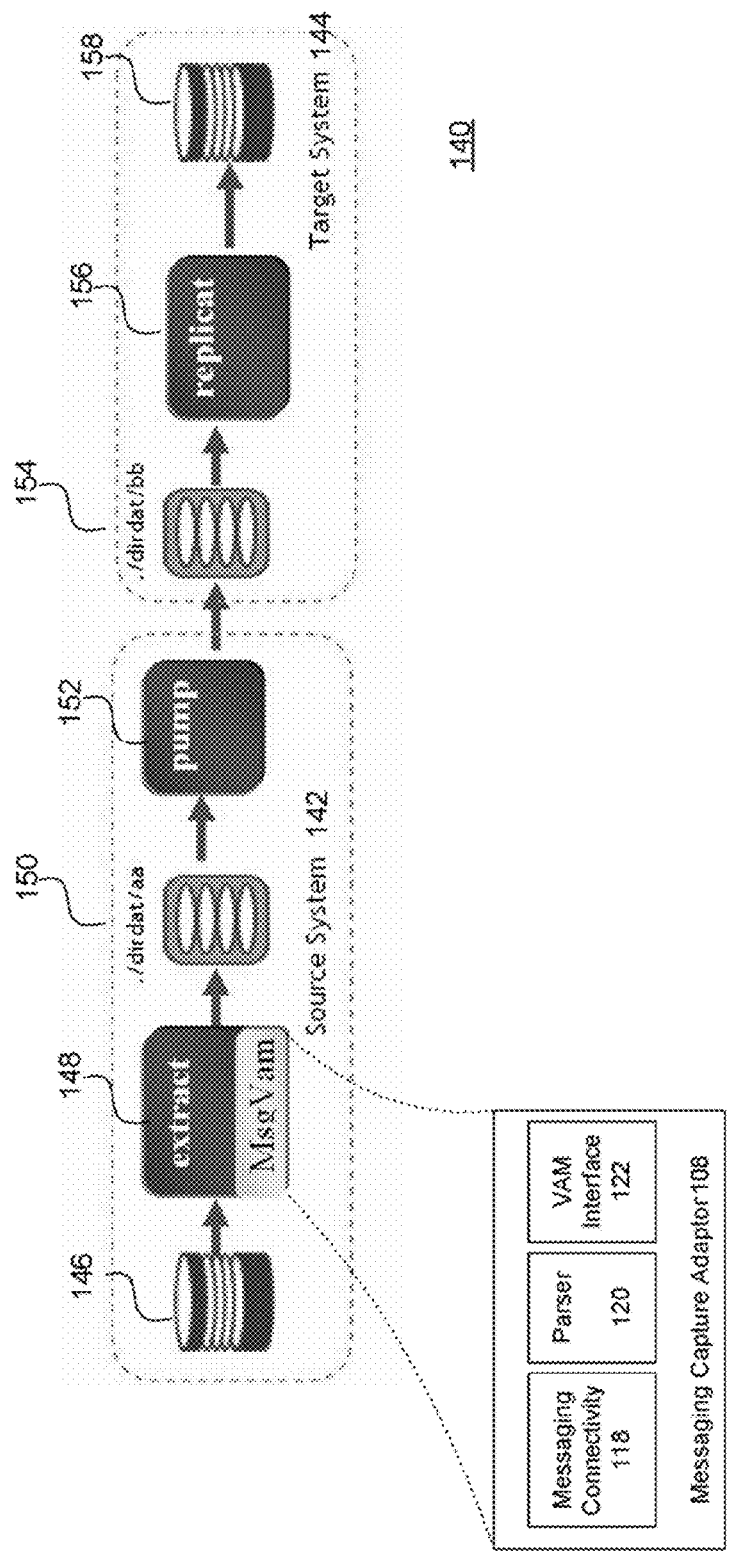
FIG. 2 is another illustration of the system for conversion of message data into database transactions, in accordance with an embodiment.

FIG. 2 is another illustration of the system for conversion of JMS message data into database transactions, in accordance with an embodiment. As shown in FIG. 2, in a typical or Generic GoldenGate installation, a source system 142 can include a database 146, extract process 148 for creating trails 150, and a pump process 152 for communicating trails to other systems. A target system 144 can similarly include a database 158, and a replication process 156 for processing received trails 154. The messaging capture adaptor VAM 108 can be added to the Generic Oracle GoldenGate installation, and used to retrieve data published to messages queues or topics, and communicate that data from the source system to the target system.

Figure 3:
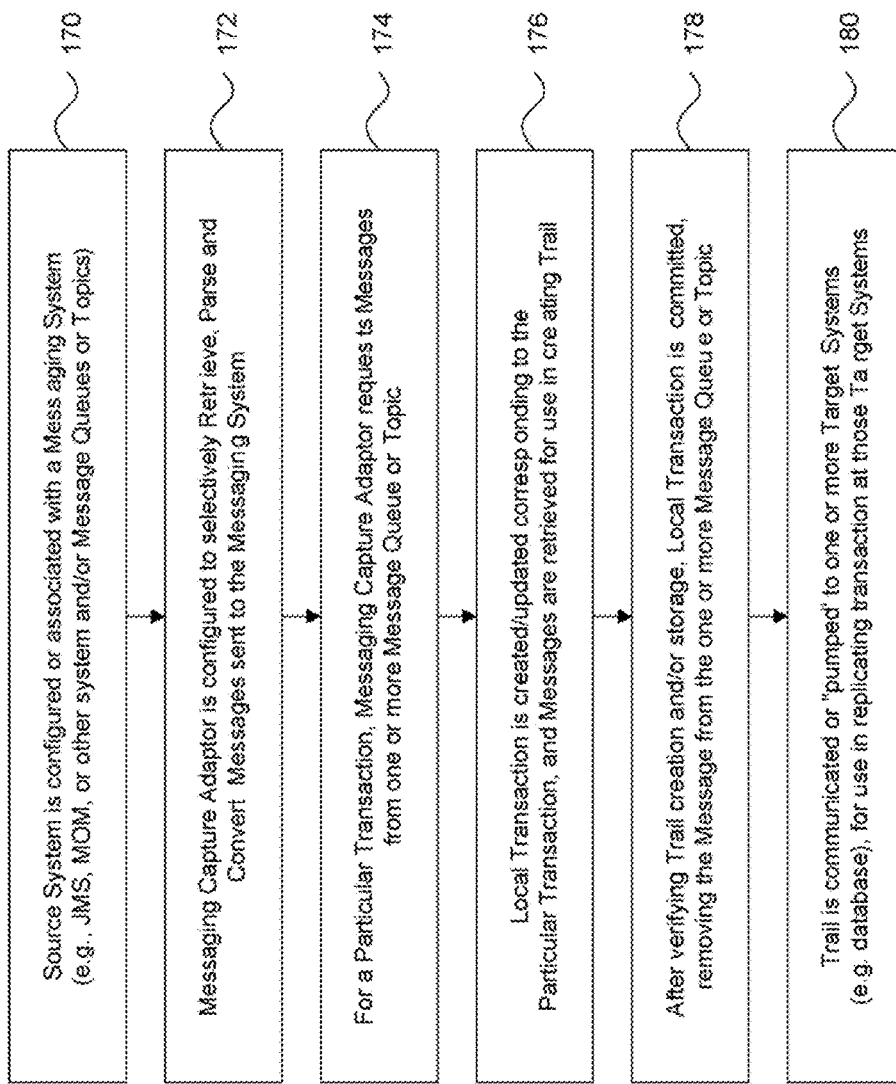
FIG. 3 is a flowchart of a process for conversion of message data into database transactions, in accordance with an embodiment.

FIG. 3 is a flowchart of a process for conversion of JMS message data into database transactions, in accordance with an embodiment. As shown in FIG. 3, in step 170, the source system is configured or associated with a messaging system (e.g., a JMS, MoM, or other system and/or message queues or topics) that allows data changes at the source system to be published or placed on a message queue or topic. In step 172, the messaging capture adaptor is configured to selectively retrieve, parse and convert messages sent to the messaging system, e.g. to a particular queue or topic. In step 174, for a particular transaction, the messaging capture adaptor requests messages from one or more message queue or topic, as configured. In step 176, a local transaction is created if it does not already exist, and/or updated corresponding to the particular transaction, and messages are retrieved for use in creating a trail for the transaction or data operation at the source system. In step 178, after verifying the trail creation and/or persistent storage of the trail file, the local transaction is committed, which remove the message from the one or more message queue or topic. In step 180, the trail information or trail file is communicated or "pumped' to one or more target systems (e.g. database), for use in replicating transaction at those target systems, for example using Oracle GoldenGate or another product.

Messaging Capture Adaptor Implementation

As described above, in accordance with an embodiment, the system comprises a messaging capture adaptor which provides for conversion and communication of data from one or more source systems, which in turn include or are associated with one or more messaging systems or messaging queues. The following sections describe a particular implementation of such an embodiment messaging capture adaptor.

in accordance with an embodiment, the Messaging Capture Adaptor (Adaptor) can be provided as an extension to a system such as, e.g. Oracle GoldenGate for Java, that processes data received in the form of messages on a message queue, and communicates with an Oracle GoldenGate extract process in order to generate a GoldenGate trail containing the processed data.

In accordance with an embodiment, the Adaptor can be provided as a Vendor Access Module (VAM) plug-in to a generic extract process. A set of properties, rules and external files can provide messaging connectivity information and define how messages are parsed and mapped to records in the target GoldenGate trail. As described above with regard to FIG. 1, in accordance with an embodiment, the Adaptor comprises three major components: a messaging connectivity component 118; a data parsing component 120; and a VAM Interface component or API 122.

In accordance with an embodiment, the Message Capture can be provided as a shared library (for example, a .so or .dll file) that integrates into the dataflow via the GoldenGate extract process. A separate utility can be provided that uses the same properties file as the Message Capture, reads in properties and any parser specific data definition, and creates a GoldenGate "sourcedefs" file to be used in conjunction with the GoldenGate trail produced by the Message Capture.

Messaging Connectivity

In accordance with an embodiment, all messaging connectivity is through a generic JMS interface. The JMS connectivity should be configured through property files, in a similar way to existing Java delivery components, allowing the following to be set: the Java classpath for the JMS client; the JMS source destination (i.e. queue or topic) name; JNDI connection properties (i.e. standard JNDI connection properties for Initial Context; connection factory JNDI name; and destination JNDI name); and security information (i.e. JNDI authentication credentials; JMS connection username and password).

The Adaptor can connect to the messaging provider on start-up; and the 'extract' process can be configured to automatically restart using standard 'manager' autorestart parameters in the event of any connectivity related errors during processing.

In accordance with an embodiment, the Adaptor supports JMS text messages. When asked by the Adaptor for the next message, the Messaging Connectivity component: starts a local JMS transaction if not already started; reads a message off the queue; if no message exists returns end of file; otherwise returns the contents of the message and any message header properties to the Adaptor.

Once the Adaptor has successfully parsed the message, has output an entire transaction to the trail, and ensured the transaction has been flushed to disk, the Messaging Connectivity component commits the JMS local transaction, removing the messages from the queue or topic. In the event of any error this local transaction can be rolled back, leaving the unprocessed messages on JMS server.

JMS properties obtained from the header are available as values in all parsers when specified in the properties file in the form $JMSProperty.

Data Parsing

In accordance with an embodiment, the Adaptor provides one or more of: fixed width message parsing; delimited message parsing; or XML message parsing.

In order to parse the data and translate it to, for example, Oracle GoldenGate records, the Parser needs to be provided with the source and target formats of the data, and rules to translate from source to target. The mechanisms used to provide this information are parser dependent. In accordance with an embodiment, a separate utility can be provided to generate an Oracle GoldenGate "source defs" file based on the data definition and parser properties.

Fixed Width Parsing

In accordance with an embodiment, the Adaptor supports fixed with parsing based on a data definition provided, e.g. in Cobol Copybook format, together with a set of properties that indicate how to map the Copybook to logical table records in an Oracle GoldenGate trail file and associated source definitions file. The Copybook should have records defined at level 01 that will map onto logical tables, together with higher level fields (05, 20, etc.) that correspond to columns of these logical tables. The data to be parsed should consist of a standard format header containing a number of fixed width fields, followed by a data segment also containing fixed width fields. The header should be defined by one of the Copybook level 01 records.

Within this record definition there must be fields that represent: a commit timestamp/change time for the record; a function code to differentiate operations of the following types (Insert; Update; Delete); and the Copybook record name required to parse the data segment.

The Copybook record name for the header record definition, and the field names for timestamp, function code and data record name should be configurable through a set of properties. An example Copybook definition containing these values is as follows:

```
01      HEADER.
        20   Hdr-Timestamp              PIC X(23)
        20   Hdr-Source-DB-Function     PIC X
        20   Hdr-Source-DB-Rec-Id       PIC X(8)
``` with corresponding example configuration properties of:

```
        fixed.header=HEADER
        fixed.timestamp=Hdr-Timestamp
        fixed.optype=Hdr-Source-DB-Function
        fixed.table=Hdr-Source-DB-Rec-Id
```

The logical table name output by the Adaptor will match the table value defined above. In accordance with an embodiment, it is possible to define the logical schema name through a static property:

fixed.schema="MYSCHEMA"

Additionally, in accordance with an embodiment, it is possible to use more than one field to determine a record name. The defined fields will simply be concatenated in the order they are provided. For example:

```
01      HEADER.
        20   Hdr-Source-DB             PIC X(8).
        20   Hdr-Source-DB-Rec-Id      PIC X(8).
        20   Hdr-Source-DB-Rec-Version PIC 9(4).
        20   Hdr-Source-DB-Function    PIC X
        20   Hdr-Timestamp             PIC X(22)
fixed.header=HEADER
fixed.table=Hdr-Source-DB-Rec-Id,Hdr-Source-DB-Rec-Version
fixed.schema="MYSCHEMA"
``` will give logical schema and table names of the form:
MYSCHEMA.Hdr-Source-DB-Rec-Id+Hdr-Source-DB-Rec-Version In accordance with an embodiment, the Adaptor should parse the timestamp using a default format of "YYYY-MM-DD HH:MM:SS:FFF" with FFF depending on the size of the field. It should also be possible to override this default format using a comment before any date/time field that contains the format in a normalized fashion. For example, to parse using the format "YYYY-MM-DD-HH.MM.SS.FF" a comment would be added as follows:

```
01      HEADER.
*       DATEFORMAT YYYY-MM-DD-HH.MM.SS.FF
        20   Hdr-Timestamp             PIC X(23)
```

The values in the optype should be mapped onto standard GoldenGate operation types using a set of properties, indicating which value of the optype maps onto which operation type. For example:

```
        fixed.optype=Hdr-Source-DB-Function
        fixed.optype.insertval=A
        fixed.optype.updateval=U
        fixed.optype.deleteval=D
```

Any fields in the header record not mapped to the GoldenGate header fields should be output as columns for all records parsed by the Adaptor. The data in the header and record data will be parsed based on the PIC definition of that data and written to the trail depending on the translated data type as follows: any field definition preceded by a timestamp format comment should be translated to an Oracle GoldenGate date/time field with an appropriate size, if no timestamp format is present, the field should be treated as its underlying datatype; any X field should be translated to CHAR datatype with the defined length; and any 9 field should be translated to a NUMBER datatype with the defined precision and scale. Signed and unsigned numbers with and without decimal points should be supported. Table 1 shows some examples.

TABLE 1

| PIC XX     | CHAR(2)     |
| PIC X(16)  | CHAR(16)    |
| PIC 9(4)   | NUMBER(4)   |
| * YYMM     | DATE(10)    |
| PIC 9(4)   | YYYY-MM-DD  |
| PIC 99.99  | NUMBER(4,2) |
| PIC 9(5)V99 | NUMBER(7,2) |

In order to identify key columns within data (not header) records in the copybook, a comment of * KEY should be used. This will mark these columns as keys when the source definitions are generated with the utility. For example:

```
10          TABLE1
*           KEY
            20   Key                    PIC X(19)
            20   PAN_Seq_Num            PIC 9(3)
``` indicates that the Key column is a key for the TABLE1 table.

Delimited Parsing

In accordance with an embodiment, the Adaptor supports delimited parsing based on a set of properties and a pre-existing source definitions file. The properties determine the delimiters to use and other rules; the source definitions file determines the valid tables that can be handled and the ordering and data types of columns in those tables. A delimited message has the format:

{METACOLS|}"[{COLNAMES|}]'"[{COLBEFOR-EVALS|}]'"{COLVALUES|}'"\n where:
  There can be n meta columns each followed by a field delimiter |
  And m columns each followed by a field delimiter (except the last one)
  For each column the name, and before value are optional
  Each record is terminated by an end of line delimiter \n
  The meta columns determine fields in the delimited record that have special meaning, corresponding to a header for that record. Valid meta columns should include:
    optype—determining if the record is an insert, update or delete
    timestamp—indicating the value to be used for the commit timestamp of the record
    schemaandtable—the full table name SCHEMA.TABLE for the record
    schema—just the SCHEMA name for the record
    table—just the TABLE name for the record
    txind—whether this record is beginning, middle, end or whole transaction
    id—value to be used as the RSN/CSN of the record and transaction (first record)

Some of these meta columns may have additional properties as follows:
- optype—values corresponding to insert, updates and deletes (default to I,U,D)
- timestamp—format of the timestamp (default to "YYYY-DD-MM HH:MM:SS.FFF")
- txind—values corresponding to begin, end, middle, whole (default to 0, 1, 2, 3)

The parsing of the delimited data should be governed by a set of properties that determine delimiters and other values as follows:
- fielddelim—define a value in ascii or hex for the field delimiter (can be 1 or more chars)
- recorddelim—define a value in ascii or hex for the record delimiter (1 or more chars)
- quote—define a value in ascii or hex to use as for quoted values (1 or more chars)
- nullindicator—define a value in ascii or hex to use for NULL values (1 or more chars)

In accordance with an embodiment, a value can be defined to look for inside data values that equates to an escaped version of any of the above delimiters. For example, inside a quoted value, replace " " with ", or \\n with \n. Data values may be present in the record with or without quotes. However, unescaping will only happen within quoted values, and a non-quoted string that matches a null indicator will be treated as null. The following additional properties should allow for more fine grained control over how the text in a delimited record is parsed:
- hasbefores—indicates before values are also present for each record
- hasnames—indicates column names are also present for each record
- afterfirst—indicates column after values come before column before values
- isgrouped—indicates all column names, before values (where present) and after values are grouped together in three blocks, rather than alternately per column When parsing dates, a default format of "YYYY-DD-MM HH:MM:SS.FFF" should be used. However, in certain cases this will need to be overridden. The user should be able to override this on a global, table or column level. For example:

```
dateformat.default=MM/DD/YYYY-HH:MM:SS
dateformat.MY.TABLE=DD/MMM/YYYY
dateformat.MY.TABLE.COL1=MMYYYY
```

In accordance with an embodiment, the parser should first read and validate the meta columns for each record. Once this step is complete, the table name should be available. This should be used to lookup the column definitions for that table in the source definitions file. The columns should then be parsed and output in the trail in the order, and in the format, defined by the source definitions. If the specified table is not present, the capture should stop.

XML Parsing

In accordance with an embodiment, the Adaptor supports XML parsing based on a set of properties and a pre-existing source definitions file. The properties determine the rules used to determine XML elements and/or attributes that correspond to transactions, operations and columns; the source definitions file determines the valid tables that can be handled and the ordering and data types of columns in those tables. An XML message to be parsed can be formatted in one of two general styles:
- Dynamic XML—contents of the XML determining tables and columns are data values at runtime that cannot be predetermined through a sample XML or XSD document
- Static XML—contents of the XML determining tables and columns element or attribute names can be predetermined through a sample XML or XSD document To further clarify this, here are two examples containing the same data:

Dynamic XML

```
<transaction id="1234" ts="2010-02-05:10:11:21">
    <operation table="MY.TABLE" optype="I">
        <column name="keycol" index="0">
            <aftervalue><![CDATA[keyval]]></aftervalue>
        </column>
        <column name="col1" index="1">
            <aftervalue><![CDATA[col1val]]></aftervalue>
        </column>
    </operation>
</transaction>
```

Every operation to every table will have the same basic message structure consisting of transaction, operation and column elements. The table name, operation type, timestamp, column names, column values, etc. are obtained from attribute or element text values.

Static XML

```
<NewMyTableEntries>
    <NewMyTableEntry>
        <CreateTime>2010-02-05:10:11:21</CreateTime>
        <KeyCol>keyval</KeyCol>
        <Col1>col1val</Col1>
    </NewMyTableEntry>
</NewMyTableEntries>
```

In this case, the NewMyTableEntries element marks the transaction boundaries. The NewMyTableEntry indicates an insert to MY.TABLE. The timestamp is present in an element text value, and the column names are indicated by element names.

In accordance with an embodiment, it should be possible to define rules in the properties file to parse either of these two styles of XML through a set of XPath like properties. The goal of the properties is to map the XML to a predefined source definitions files through XPath matches.

XML Parsing Rules

Independent of the style of XML, the system should be enabled to determine how to ascertain: transaction boundaries; operation entries and meta data including table name, operation type, timestamp; and column entries and meta data including column name and/or index, column before and/or after values.

This can be done through a set of inter-related rules. In accordance with an embodiment, for each type of XML message to be processed there can be one high-level rules that encapsulates the detailed rules to obtain the above data. These can be specified through a set of properties. For example:

```
xmlparser.rules=genericrule
xmlparser.rules.genericrule.type=tx
xmlparser.rules.genericrule.subrules=oprule
xmlparser.rules.oprule.type=op
...
```

Generic Rule Concepts

All rules should have the following generic properties:
- name—a mechanism to identify the rule (part of property name); type—either transaction, operation or column; match—an XPath expression determining when to activate the rule (can be omitted); and subrules—a set of rule names to be executed when this rule is matched. Each of the rule types should then have additional properties specific to that type.

XPath Expressions

In accordance with an embodiment, the XML parser supports a subset of XPath expressions necessary to match elements and extract data. It is not the intention to support the full set of XPath functionality. An expression can be used to match a particular element, or extract data. In the data extraction case most of the path is used to match, the tail of the expression is used for extraction. The following constructs should be supported:

```
/e - use absolute path from the root of the document to match e
./e or e - use relative path from current node being processed to match e
../e - use a path based on the parent of the current node (can be repeated) to match e
//e - matches e wherever it occurs in a document
* - wildcard match to match any element (partial wild-carded names are out of scope)
[n] - match the nth occurrence of an expression
= [x=v] - match when x is equal to some value v where x can be: @att - some attribute value, text( ) - some text value, name( ) the element name, position( ) the element position.
```

This should support simple expressions such as:

```
match root element: /My/Element
match sub element to current node: ./Sub/Element
``` or more complex expressions such as:

```
match nth element: /My/*[n]
match nth Some element: /My/Some[n]
match any text val: /My/*[text( ) ='value']
match text in Some element: /My/Some[text( ) = 'value']
match any attribute: /My/*[@att = 'value']
match attribute in Some element: /My/Some[@att = 'value']
```

In addition to matching paths, the XPath expressions can also be used to obtain data values, either absolutely, or relative to the current node being processed. Data value expressions can contain any of the path elements above, but must end with one of:

@att—some attribute value
text( )—the text content (value) of an element
content( )—the full content, including any child XML nodes of an element
name( )—the name of an element
position( )—the position of an element in its parent Examples of these include:

```
extract relative element text value: ./My/Element/text( )
extract absolute attribute value: /My/Element/@att
extract element text value with match: /My/Some[@att = 'value']/Sub/text( )
```

Other Value Expressions

In accordance with an embodiment, in addition to XPath expressions, values should also be able to be directly extracted from JMS message properties as detailed earlier, or hardcoded values of the form "value".

Transaction Rules

In accordance with an embodiment, the boundary for a transaction is the highest level rule. The options for how to determine transactions from the contents of XML are as follows: each message contains a single transaction; each message can contain multiple transactions; transaction can span messages. These are specified as follows:

single—transaction rule match not defined
multiple—each transaction rule match defines new transaction
span—no transaction rule is defined, a transaction indicator is specified in an operation rule If a transaction rule is specified, the following properties of the rule may also be defined through XPath or other expressions:

timestamp—time at which the transaction occurred
id—an identifier for the transaction (optional)

Examples of transaction rules are as follows:

```
// transaction is whole message, timestamp comes from JMS property
singletxrule.timestamp=$JMSTimeStamp
// match root element transaction and obtain timestamp from ts attribute
dyntxrule.match=/Transaction
dyntxrule.timestamp=@ts
```

Transaction rules can have multiple subrules, but each must be of type operation.

Operation Rules

In accordance with an embodiment, an operation rule can either be a subrule of a transaction rule, or a highest level rule (if transactionality is determined via a property of the operation. In addition to the standard rule properties an operation rule should also define the following through XPath or other expressions:

timestamp—timestamp of the operation (optional if transaction rule is defined)
table—name of the table on which this is an operation and
schema—name of schema for the table or just
schemaandtable—both schema and table name together in the form SCHEMA.TABLE
optype—whether this is an insert, update or delete operation based on optype values:
  optype.insertval—value indicating an insert, defaults to 'I'
  optype.updateval—value indicating an update, defaults to 'U'
  optype.deleteval—value indicating a delete, defaults to 'D'
id—an identifier for the operation (optional)
txind—whether this operation is begin/middle/end/whole operation if (optional, and only valid if the operation rule is not a subrule of a transaction rule)

Examples of operation rules are as follows:

```
// dynamically obtain operation info from the /Operation element of a
/Transaction
dynoprule.match=./Operation
dynoprule.schemaandtable=@table
dynoprule.optype=@type
// statically match /NewMyTableEntry element to an insert operation on
the MY.TABLE
table:
statoprule.match=./NewMyTableEntry
statoprule.schemaandtable="MY.TABLE"
statoprule.optype="I"
statoprule.timestamp=./CreateTime/text( )
```

Operation rules can have multiple subrules, of type operation or column.

Column Rules

In accordance with an embodiment, a column rule must be a subrule of an operation rule. In addition to the standard rule properties, a column rule should also define the following through XPath or other expressions:

- name—the name of the column within the table definition and/or
- index—the index of the column within the table definition (NOTE: if only one of the above is defined, the other will be determined)
- before.value—before value of the column (required for deletes, optional for updates)
- before.isnull—indicates whether the before value of the column is null
- before.ismissing—indicates whether the before value of the column is missing
- after.value—before value of the column (required for deletes, optional for updates)
- after.isnull—indicates whether the before value of the column is null
- after.ismissing—indicates whether the before value of the column is missing
- value—an expression to use for both before.value and after.value (does not support different before values for updates) unless overridden by specific before or after values
- isnull—an expression to use for both before.isnull and after.isnull unless overridden
- ismissing—an expression to use for both before.ismissing and after.ismissing unless overridden Examples of column rules are as follows:

```
// dynamically obtain column info from the /Column element of an
/Operation
dyncolrule.match=./Column
dyncolrule.name=@name
dyncolrule.before.value=./beforevalue/text( )
dyncolrule.after.value=./aftervalue/text( )
// statically match /KeyCol and /Col1 elements to columns in MY.TABLE
statkeycolrule.match=/KeyCol
statkeycolrule.name="keycol"
statkeycolrule.value=./text( )
statcol1rule.match=/Col1
statcol1rule.name="col1"
statcol1rule.value=./text( )
```

In accordance with an embodiment, the example shown in Table 2 uses the XML samples provided before, with appropriate rules to generate the same resulting operation on the MY.TABLE table.

TABLE 2

| | |
|---|---|
| `<transaction id="1234" ts="2010-02-05:10:11:21">`<br>`<operation table="MY.TABLE" optype="I">`<br>`<column name="keycol" index="0">`<br>`<aftervalue>`<br>`<![CDATA[keyval]]>`<br>`</aftervalue>`<br>`</column>`<br>`<column name="col1" index="1">`<br>`<aftervalue>`<br>`<![CDATA[col1val]]>`<br>`</aftervalue>`<br>`</column>`<br>`</operation>`<br>`</transaction>`<br>dyntxrule.match=/Transaction<br>dyntxrule.timestamp=@ts<br>dyntxrule.subrules=dynoprule<br>dynoprule.match=./Operation<br>dynoprule.schemaandtable=@table<br>dynoprule.optype=@type<br>dynoprule.subrules=dyncolrule<br>dyncolrule.match=./Column<br>dyncolrule.name=@name<br>dyncolrule.before.value=./beforevalue/text( )<br>dyncolrule.after.value=./aftervalue/text( )<br>INSERT INTO MY.TABLE (KEYCOL, COL1) VALUES ('keyval', 'col1val')<br>Occurred at 2010-02-05 10:11:21 | `<NewMyTableEntries>`<br>`<NewMyTableEntry>`<br>`<CreateTime>`<br>`2010-02-05:10:11:21`<br>`</CreateTime>`<br>`<KeyCol>keyval</KeyCol>`<br>`<Col1>col1val</Col1>`<br>`</NewMyTableEntry>`<br>`</NewMyTableEntries>`<br>stattxrule.match=/NewMyTableEntries<br>stattxrule.subrules= statoprule<br>statoprule.match=./NewMyTableEntry<br>statoprule.schemaandtable="MY.TABLE"<br>statoprule.optype="I"<br>statoprule.timestamp=./CreateTime/text( )<br>statoprule.subrules= statkeycolrule, statcol1rule<br>statkeycolrule.match=/KeyCol<br>statkeycolrule.name="keycol"<br>statkeycolrule.value=./text( )<br>statcol1rule.match=/Col1<br>statcol1rule.name="col1"<br>statcol1rule.value=./text( ) |

Source Definitions Generation Utility

In accordance with an embodiment, a utility that generates a GoldenGate source definitions file from the properties defined in a properties file can be provided, which reads in the properties file, and outputs a normalized definition of tables, based on property settings and other parser specific data definition values. The usage should be:

{program-name}-prop {property file}[-out{output file}]

This will default to outputting the source defs to standard out, but can be directed to a file with the—out parameter, e.g.
  {program-name}-prop dirprm/vam.properties-out dirdef/vamdefs.def The output sourcedefs file can then be used in a pump or delivery process to understand the trail data created through the VAM.

Installation Prerequisites

In accordance with an embodiment, the Message Capture Adapter requires and/or is intended for use with a build of Oracle GoldenGate version 10.4 or above.

Installing the Message Capture

In accordance with an embodiment, the Message Capture can be prebuilt and prepackaged for a particular platform (e.g. on windows it is shipped as a zip file; on UNIX, as a "tar" file). The file should contain: shared library; required Java code; sample VAM properties file(s); and a sample extract parameter file.

Configuration—Typical GoldenGate Configuration for Message Capture

In accordance with an embodiment, a typical GoldenGate Configuration for Message Capture is shown and described above with regard to FIG. 2. In accordance with an embodiment, the message capture VAM can be added to a generic GoldenGate installation using the following commands in GGSCI:

```
add extract <extname>, VAM
add exttrail ./dirdat/aa, extract <extname>, megabytes 100
```

Using the VAM

In accordance with an embodiment, the VAM should be invoked through a standard GoldenGate extract parameter file, for example as shown in Table 3.

TABLE 3

| | |
|---|---|
| Extract E_JMS | Extract name |
| VAM libjava5vam.so, PARAMS (dirprm/vam.properties) | The location of the Vam library is by default found in the GG install directory. The VAM properties file should be in 'dirprm'. |
| TRANLOGOPTIONS VAMCOMPATIBILITY 1 TRANLOGOPTIONS GETMETADATAFROMVAM | Tells extract that metadata will be sent by the MsgVam. |
| ExtTrail dirdat/aa | A target trail. Forward slashes ("/") work for Windows or Unix. |
| Table GGS.*; Table FOO.*; | A list of tables to process; the table name can be a wildcard. A schema name (e.g., GGS) must be specified. |

Due to the nature of messaging systems, standard GoldenGate repositioning commands may not be supported. For example, alter e_jms begin now will have no effect on the extract, it will always resume taking messages from the end of the queue.

Configuring Message Capture

In accordance with an embodiment, the Message Capture reads properties from a properties file specified via the PARAMS parameter within the extract parameter file as shown above. This properties file contains information such as logging settings, parser mappings, and JMS connection settings.

Detailed Requirements

The following sections detail the various property settings required for the Message Capture VAM. The property settings are split into the following sections: Logging; JMS Connection; and Parsing. Each property specification includes usage description and examples. All properties in the property file are of the form:
  fully.qualified.name=value The value may be a single string, integer, or boolean, or could be comma delimited strings. Comments can be entered in to the properties file with the # prefix at the beginning of the line. For example:

```
# This is a property comment
some.property=value
```

Properties themselves can also be commented, which is useful in testing configurations without losing previous property settings.

Logging

Logging is standard to many GoldenGate adaptors and is controlled by the following properties. In accordance with an embodiment, for the Messaging Capture and other Java Adaptors, the Java side of the integration can also be configured to produce an additional log file.

log.logname

Takes any valid ascii string as the prefix to the log file name. The log file produced has the current data appended to it in yyyymmdd format, together with the .log extension.
  log.logname={log-prefix}
For example:

```
# log file prefix
log.logname=msgvam
``` would produce a log file of name msgvam_20090503.log on May 3, 2009. The log file will roll over each day independent of the starting/stopping of processes. It is possible to include directory names in the name of the log file, e.g. dirrpt/msgvam, but the directories should already exist.

log.level

Set the overall log level of the logging module for all modules.
  log.level=ERROR|WARN|INFO|DEBUG
The log levels are defined as follows:
  ERROR—Only write messages if errors occur
  WARN—Write error and warning messages
  INFO—Write error, warning and informational messages
  DEBUG—Write all messages, including debug ones.

The default logging level is INFO. The messages in this case will be produced on startup, shutdown and periodically during operation, but would not impede performance of the data path. If the level is switch to DEBUG, large volumes of messages may occur which could impede performance. For example:

```
# global logging level
log.level=INFO
``` sets the global logging level to INFO
log.tostdout

Determines whether log information should be written to standard out. Useful if the extract process running the VAM is started on the command line, or on operating systems where stdout is piped into the report file.

log.tostdout=true|false

The default is false. If true, log output is written to stdout.

log.tofile

Determines whether log information should be written to the specified log file.

log.tofile=true|false

The default is false. If true, log output is written to the named log file.

JMS Connection Properties

In accordance with an embodiment, these specify how to start up the JVM running the JMS integration, and properties for the JMS Connection.

jvm.bootoptions

This property configures the arguments passed to the internal instance of the JVM:

jvm.bootoptions={JVM option}[, . . . ]

These options should be the same as would be passed to "java" if this it were executed on the command-line. Options may include: the classpath; system properties; JVM memory options (max memory, initial memory, etc.) that are valid for the particular instance of Java being used. Valid options may vary per JVM version and provider. On Windows, classpath entries must be separated with a semicolon (";"). On Linux/UNIX, they must be separated with a colon (":"). Additional system properties may be set, such as the Log 4j configuration file. For example:

```
jvm.bootoptions=-Djava.class.path=.:dirprm:ggjava/ggjava.jar:
              -Dlog4j.configuration=log4j.properties
``` jms.report.output

Determines where the jms report is written to:

jms.report.output=report|log|both where report will target the JMS report to the OGG report file (default), log will write it to the Java log file (if one is configured) and both will target both locations. For example:

jms.report.output=both jms.report.time

Determines the frequency of report generation based on time.

jms.report.time={time-specification}

For example, to write a report every 6 hours, jms.report.time=6 hr jms.report.records Determines the frequency of report generation based on number of records.

jms.report.records={number}

For example, to write a report every 1000 records, jms.report.records=1000 jms.id

Determines how to create a unique ID passed back from the JMS integration to the Message Capture VAM. This may be used by the VAM as a unique sequence ID for records.

jms.id=ogg|time|wmq|activemq|{message-header}|{custom-java-class} where:

ogg—obtains message header property "GG_ID" which is set by OGG JMS delivery.

time—use a system timestamp as a starting point for message IDs wmq—reformats a WebSphere MQ Message ID for use with the VAM activemq—reformats an ActiveMQ Message ID for use with the VAM {message-header}—can include JMSMessageID, JMSCorrelationID, JMSTimestamp or any other user set custom JMS message header {custom-java-class}—a custom Java class which creates a string to be used as an ID.

EXAMPLES

```
jms.id=JMSMessageID
jms.id=time
```

The ID returned must be unique, incrementing, and fixed-width. If there are duplicate numbers, the duplicates will be skipped. If the message ID changes length, "extract" will abend.

jms.destination

Determines the queue or topic name to be looked up via JNDI.

jms.destination={jndi-name}

For example:

jms.destination=sampleQ jms.connectionFactory

Determines the connection factory name to be looked up via JNDI.

jms.connectionFactory={jndi-name}

For example:

jms.connectionFactory=ConnectionFactory jms.user, jms.password

Determine the user name and password of the JMS connection itself, as specified by the JMS provider.

```
jms.user={user-name}
jms.user={password}
```

This is not used for JNDI security—for setting JNDI authentication, the properties "java.naming.security." can be used)

For example:

```
jms.user=myuser
jms.password=mypasswd
```

JNDI Properties

In accordance with an embodiment, in addition to specific properties for the Message Capture VAM, the JMS integration should also support setting of JNDI properties required to obtain a connection to an Initial Context from which the connection factory and destination can be looked up. The following properties must be set:

```
java.naming.provider.url={url}
java.naming.factory.initial={java-class-name}
``` and the following may be set if JNDI security is enabled:

```
java.naming.security.principal={user-name}
java.naming.security.credentials={password-or-other-authenticator}
```

For example:

```
java.naming.provider.url=t3://localhost:7001
java.naming.factory.initial=weblogic.jndi.WLInitialContextFactory
java.naming.security.principal=jndiuser
java.naming.security.credentials=jndipw
```

Parser Properties

In accordance with an embodiment, these specify which parser to use, how the unique record sequence number is obtained, and specific properties of the chosen parser.
parser.type
    Specifies the parser to use:
    parser.type=fixed|delim|xml
where:
    fixed—invokes the fixed width parser
    delim—invokes the delimited parser
    xml—invokes the xml parser
The remaining properties are parser specific.
For example:
    parser. type=delim
Fixed Parser Properties In accordance with an embodiment the following are required properties for parser=fixed.
fixed.schema
    Specifies what kind of file is used by the Message Capture as metadata. The two valid options are sourcedefs and copybook.
    fixed.schema=sourcedefs|copybook
For example:
    fixed.schema=copybook
Other properties will be required to be set, based on the value of this property to determine how to parse the incoming data.
fixed.sourcedefs
    If the sourcedefs option was specified above, then this property specifies the location of the sourcedefs file to be read in.
    fixed.sourcedefs={file-location}
For example:
    fixed.sourcedefs=dirdef/hrdemo.def
fixed.copybook
    Location of the copybook file to be read in by the Message Capture process. To be used if the schema property was set to copybook.
    fixed.copybook={file-location}
For example:
    fixed.copybook=test_copy_book.cpy
fixed.header
    Determines the name of the source defs entry or copy book record that contains header information used to determine the data block structure:
    fixed.header={record-name}
For example:
    fixed.header=HEADER
fixed.seqid
    Determines the name of the header field, JMS property, or system value that contains the seqid used to uniquely identify individual records. This value must be continually increasing and have the last character be the least significant.
    fixed.seqid={field-name}|${jms-property}|*seqid
where:
    field-name—indicates the name of a header field containing the seqid
    jms-property—uses the value of the specified JMS header property, a special value of this is $jmsid which uses the value returned by the mechanism chosen by the jms.id property
    seqid—indicates a simple continually incrementing 64 bit integer generated by the system
For example:
    fixed.seqid=$jmsid
fixed.timestamp
    Determines the name of the field, JMS property, or system value that contains the timestamp.
    fixed.timestamp={field-name}|${jms-property}|*ts
For example:

```
fixed.timestamp=TIMESTAMP
fixed.timestamp=$JMSTimeStamp
fixed.timestamp=*ts
``` fixed.timestamp.format
    Determines the format of the timestamp field.
    fixed.timestamp.format={format}
where the format can include punctuation characters plus:
    YYYY—four digit year
    YY—two digit year
    M[M]—one or two digit month
    D[D]—one or two digit day
    HH—hours in twenty four hour notation
    MI—minutes
    SS—seconds
    F"—n number of fractions
The default format is "YYYY-MM-DD:HH:MI:SS.FFF"
For example:
    fixed.timestamp.format=YYYY-MM-DD-HH.MI.SS
fixed.txid
    Determines the name of the field, JMS property, or system value that contains the txid used to unique identify transactions. This value must be continually increasing for each transaction.
    fixed.txid={field-name}|${jms-property}|*txid
For most cases using the system value of *txid is preferred.
For example:

```
fixed.txid=$JMSTxId
fixed.txid=*txid
``` fixed.txowner
    Optionally, determines the name of the field, JMS property, or static value that contains an arbitrary user name associated with a transaction. This value may be used to exclude certain transactions from processing
    fixed.txowner={field-name}|${jms-property}|"{value}"
For example:

```
fixed.txowner=$MessageOwner
fixed.txowner="jsmith"
``` fixed.txname

Optionally, determines the name of the field, JMS property, or static value that contains an arbitrary name to be associated with a transaction fixed.txname={field-name}|${jms-property}|"value"

For example:

fixed.txname="fixedtx"

fixed.optype

Determines the name of the field, or JMS property that contains the operation type, which is validated against the op type values specified in the next sections.

fixed.header.optype={field-name}|${jms-property}

For example:

fixed.header.optype=FUNCTION fixed.optype.insertval

The value to look for to identify an operation as an Insert type operation. The default is 'I'.

fixed.optype.insertval={value}|\x{hex-value}

For example:

fixed.optype.insertval=A fixed.optype.updateval

The value to look for to identify an operation as an Update type operation. The default is 'U'.

fixed.optype.updateval={value}|\x{hex-value}

For example:

fixed.optype.updateval=M fixed.optype.deleteval

The value to look for to identify an operation as a Delete type operation. The default is 'D'.

fixed.optype.deleteval={value}|\x{hex-value}

For example:

fixed.optype.deleteval=R fixed.table

Determines the name of the table, which enables the parser to look up the corresponding data record definition needed to translate the portion of the data remaining after the header.

fixed.table={field-name}|${jms-property}[, . . . ]

More than one comma delimited field name may be used to determine the name of the table Each field name corresponds to a field in the header record defined by the fixed.header property, or JMS property. The values of these fields are concatenated together to identify the data record. For example:

```
fixed.table=$JMSTableName
fixed.table=SOURCE_Db,SOURCE_Db_Rec_Version
``` fixed.schema

Determines the static name of the schema when generating table names SCHEMA.TABLE.

fixed.schema="{value}"

For example:

fixed.schema="OGG"

fixed.txind

Optionally determines the name of the field, or JMS property that contains a transaction indicator, which is validated against the transaction indicator values. If not defined all operations within a single message will be seen to have occurred within a whole transaction. If defined, then will determine the beginning, middle and end of transactions. Transactions defined in this way can span messages.

fixed.txind={field-name}|${jms-property}

For example:

fixed.txind=$TX_IND fixed.txind.beginval

The value to look for to identify an operation as the beginning of a transaction. Defaults to 'B'.

fixed.txind.beginval={value}|\x{hex-value}

For example:

fixed.txind.beginval=0 fixed.txind.middleval

The value to look for to identify an operation as the middle of a transaction. Defaults to 'M'.

fixed.txind.middleval={value}|\x{hex-value}

For example:

fixed.txind.middleval=1 fixed.txind.endval

The value to look for to identify an operation as the end of a transaction. Defaults to 'E'.

fixed.txind.endval={value}|\x{hex-value}

For example:

fixed.txind.endval=2 fixed.txind.wholeval

The value to look for to identify an operation as a whole transaction. Defaults to 'W'.

fixed.txind.wholeval={value}|\x{hex-value}

For example:

fixed. txind.wholeval=3

Delimited Parser Properties

In accordance with an embodiment the following are required properties for parser=delim.

delim.sourcedefs

Specifies the location of the sourcedefs file to be read in.

delim.sourcedefs={file-location}

For example:

delim.sourcedefs=dirdef/hrdemo.def delim.header

Determines the list of values to be read before encountering the data and assigns names to each value.

delim.header={name}, [ . . . ]

The names used should be unique and can be referenced in other delim properties by wherever header fields can be used.

For example:

```
delim.header=optype, tablename, ts
delim.timestamp=ts
``` delim.seqid

Determines the name of the header field, JMS property, or system value that contains the seqid used to uniquely identify individual records. This value must be continually increasing and have the last character be the least significant.

delim.seqid={field-name}|${jms-property}|*seqid where:

field-name—indicates the name of a header field containing the seqid jms-property—uses the value of the specified JMS header property, a special value of this is $jmsid which uses the value returned by the mechanism chosen by the jms.id property seqid—indicates a simple continually incrementing 64 bit integer generated by the system For example:

delim.seqid=$jmsid delim.timestamp

Determines the name of the JMS property, header field, or system value that contains the timestamp.

delim.timestamp={field-name}|${jms-property}|*ts

For example:

```
delim.timestamp=TIMESTAMP
delim.timestamp=$JMSTimeStamp
delim.timestamp=*ts
``` delim.timestamp.format
   Determines the format of the timestamp field.
   delim.timestamp.format={format}
where the format can include punctuation characters plus:
   YYYY—four digit year
   YY—two digit year
   M[M]—one or two digit month
   D[D]—one or two digit day
   HH—hours in twenty four hour notation
   MI—minutes
   SS—seconds
   F"—n number of fractions
The default format is "YYYY-MM-DD:HH:MI:SS.FFF" For example:
   delim.timestamp.format=YYYY-MM-DD-HH.MI.SS
delim.txid
   Determines the name of the JMS property, header field, or system value that contains the txid used to unique identify transactions. This value must be continually increasing for each transaction.
   delim.txid={field-name}|${jms-property}|*txid
For most cases using the system value of *txid is preferred. For example:

```
delim.txid=$JMSTxId
delim.txid=*txid
``` delim.txowner
   Optionally, determines the name of the JMS property, header field, or static value that contains an arbitrary user name associated with a transaction. This value may be used to exclude certain transactions from processing
   delim.txowner={field-name}|${jms-property}|"{value}"
For example:

```
delim.txowner=$MessageOwner
delim.txowner="jsmith"
``` delim.txname
   Optionally, determines the name of the JMS property, header field, or static value that contains an arbitrary name to be associated with a transaction
   delim.txname={field-name}|${jms-property}|"value"
For example:
   delim.txname="fixedtx"
delim.optype
   Determines the name of the JMS property, or header field, that contains the optype to be validated against an optype insertval, etc.
   delim.optype={field-name}|${jms-property}
For example:
   delim.optype=optype
delim.optype.insertval
   The value to look for to identify an operation as an Insert type operation. The default is 'I'.
   delim.optype.insertval={value}|\x{hex-value}

For example:
   delim.optype.insertval=A
delim.optype.updateval
   The value to look for to identify an operation as an Update type operation. The default is 'U'.
   delim.optype.updateval={value}|\x{hex-value}
For example:
   delim.optype.updateval=M
delim.optype.deleteval
   The value to look for to identify an operation as a Delete type operation. The default is 'D'.
   delim.optype.deleteval={value}|\x{hex-value}
For example:
   delim.optype.deleteval=R
delim.schemaandtable
   Determines the name of the JMS property, or header field that contains the schema and table name in the form SCHEMA.TABLE.
   delim.schemaandtable={field-name}|${jms-property}
For example:
   delim.schemaandtable=$FullTableName
delim.schema
   Determines the name of the JMS property, header field, or hard-coded value that contains the schema name.
   delim.schema={field-name}|${jms-property}|"value"
For example:
   delim.schema="OGG"
delim.table
   Determines the name of the JMS property, or header field that contains the table name.
   delim.table={field-name}|${jms-property}
For example:
   delim.table=TABLE_NAME
delim.txind
   Optionally determines the name of the JMS property, or header field that contains the transaction indicator to be validated against beginval etc. If not defined all operations within a single message will be seen to have occurred within a whole transaction. If defined, then will determine the beginning, middle and end of transactions. Transactions defined in this way can span messages.
   delim.txind={field-name}|${jms-property}
For example:
   delim.txind=txind
   delim.txind.beginval
   The value to look for to identify an operation as the beginning of a transaction. Defaults to 'B'.
   delim.txind.beginval={value}|\x{hex-value}
For example:
   delim.txind.beginval=0
delim.txind.middleval
   The value to look for to identify an operation as the middle of a transaction. Defaults to 'M'.
   delim.txind.middleval={value}|\x{hex-value}
For example:
   delim.txind.middleval=1
delim.txind.endval
   The value to look for to identify an operation as the end of a transaction. Defaults to 'E'.
   delim.txind.endval={value}|\x{hex-value}
For example:
   delim.txind.endval=2
delim.txind.wholeval
   The value to look for to identify an operation as a whole transaction. Defaults to 'W'.
   delim.txind.wholeval={value}|\x{hex-value}

For example:
    delim.txind.wholeval=3
delim.fielddelim
    Determines the delimiter value to be used to separate fields (columns) in the data. Can be defined through characters or hex values:
    delim.fielddelim={value}|\x{hex-value}
For example:

---
delim.fielddelim=,
delim.fielddelim=\xc7
--- delim.linedelim
    Determines the delimiter value to be used to separate lines (records) in the data. Can be defined through characters or hex values:
    delim.linedelim={value}|\x{hex-value}
For example:
    delim.linedelim=|
    delim.linedelim=\x0a
delim.quote
    Determines the value to be used to identify quoted data, Can be defined through characters or hex values:
    delim.quote={value}|\x{hex-value}
For example:
    delim.quote="
delim.nullindicator
    Determines the value to be used to identify NULL data, Can be defined through characters or hex values:
    delim.nullindicator={value}|\x{hex-value}
For example:
    delim.nullindicator=NULL
delim.fielddelim.escaped
    Determines the value to look for that indicates a true field delimiter is present in some data. This will then be replaced with the fielddelim value.
    delim.fielddelim.escaped={value}|\x{hex-value}
For example:
    delim.fielddelim.escaped=$,$
delim.linedelim.escaped
    Determines the value to look for that indicates a true line delimiter is present in some data. This will then be replaced with the linedelim value.
    delim.linedelim.escaped={value}|\x{hex-value}
For example:
    delim.linedelim.escaped=\x0affa0
delim.quote.escaped
    Determines the value to look for that indicates a true quote is present in some data. This will then be replaced with the quote value.
    delim.quote.escaped={value}|\x{hex-value}
For example:
    delim.quote.escaped="""
delim.nullindicator.escaped
    Determines the value to look for that indicates a true null indicator is present in some data. This will then be replaced with the nullindicator value.
    delim.nullindicator.escaped={value}|\x{hex-value}
For example:
    delim.nullindicator.escaped={NULL}
delim.hasbefores
    Determines whether before values are present in the data.
    delim.hasbefores=true|false
Defaults to false. If true, the parser will expect to find before and after values of columns for all records. The before values will then be used for updates and deletes, the after values for updates and inserts. The 'afterfirst' property determines whether the before images should be expected before the after images or after them. If false, then no before values will be expected. For example:
    delim.hasbefores=true
delim.hasnames
    Determines whether column names are present in the data.
    delim.hasnames=true|false
Defaults to false. If true, the parser will expect to find column names for all records. The parser will validate the column names against the expected column names. If false, then no column names will be expected. For example:
    delim.hasnames=true
delim.afterfirst
    Determines whether the after values should be expected before or after the before values.
    delim.afterfirst=true|false
Defaults to false. If true, the parser will expect to find the after values before the before values. If false, then the after values will be expected before the before values. For example:
    delim.afterfirst=true
delim.isgrouped
    Determines whether the column names, before and after images should be expected grouped together for all columns or interleaved for each column.
    delim.isgrouped=true|false
Defaults to false. If true, the parser will expect find a group of columns names first (if hasnames is true) followed by a group of before values (if hasbefores), followed by a group of after values (the afterfirst setting will reverse the before and after value order). If false, the parser will expect to find a column name (if hasnames), before value (if hasbefores) and after value for each column. For example:
    delim.isgrouped=true
delim.dateformat
    Determines the date format for column data. Should be able to parse using similar format strings to parser.timestamp.format. This should be able to be specified at a global level, a table level or column level.

---
delim.dateformat={format}
delim.dateformat.{TABLE}={format}
delim.dateformat.{TABLE}.{COLUMN}={format}
--- where:
    {format} is as defined for parser.timestamp.format
    {TABLE} is a fully qualified table name
    {COLUMN} is a column of the specified table.
For example:

---
delim.dateformat=YYYY-MM-DD HH:MI:SS
delim.dateformat.MY.TABLE=DD/MM/YY-HH.MI.SS
delim.dateformat.MY.TABLE.EXP_DATE=YYMM
---

XML Parser Properties
xml.sourcedefs
    Specifies the location of the sourcedefs file to be read in.
    xml.sourcedefs={file-location}
For example:
    xml.sourcedefs=dirdef/hrdemo.def xml.rules
 Determines the list of XML rules to be used for parsing a message and converting to transactions, operations and columns:
  xml.rules={xml-rule-name}[, ... ]
The specified XML rules will be processed in the order listed. All rules matching a particular XML document may result in the creation of transactions, operations and columns. The specified XML rules should be transaction or operation type rules. For example:
  xml.rules=dyntxrule, statoprule
{rulename}.type
 Determines the type of an XML rule:
  {rulename}.type=tx|op|col
 where:
  tx—indicates a transaction rule
  op—indicates an operation rule
  col—indicates a column rule
 For example:

```
dyntxrule.type=tx
statoprule.type=op
```

{rulename}.match
 Specifies an XPath expression used to determine whether the rule is activated for a particular document or not:
  {rulename}.match={xpath-expression}
If the XPath expression returns any nodes from the document, the rule has been match and further processing occurs. If it does not return any nodes, the rule is ignored for that particular document.
For example:
  dyntxrule.match=/Transaction
will activate the dyntxrule if the document has a root element of Transaction
  statoprule.match=./NewMyTableEntry
where statoprule is a subrule of stattxtule, will activate the statoprule if the parent rules matching nodes have child elements of NewMyTableEntry
{rulename}.subrules
 Specifies a list of rule names that should be check for matches if the parent rule is activated by its match.
  {rulename}.subrules={xml-rule-name}[, ... ]
The specified XML rules will be processed in the order listed. All matching rules may result in the creation of transactions, operations and columns. The valid subrules will be determined by the parent type. Transaction rules can only have operation subrules. Operation rules can have operation or column subrules. Column rules cannot have subrules. For example:

```
dyntxrule.subrules=dynoprule
statoprule.subrules=statkeycolrule, statcol1rule
```

{txrule}.timestamp
 Optionally determines the XPath expression or JMS property that contains the transaction commit timestamp, or to use the current system time.
  {txrule}.timestamp={xpath-expression}|${jms-property}|*ts
The timestamp for the transaction may be overridden at the operation level, or may only be present at the operation level. Any XPath expression must end with a value accessor such as @att of text( ).

For example:
  dyntxrule.timestamp=@ts
{txrule}.timestamp.format
 Determines the format of the timestamp field.
  {txrule}.timestamp.format={format}
where the format can include punctuation characters plus:
  YYYY—four digit year
  YY—two digit year
  M[M]—one or two digit month
  D[D]—one or two digit day
  HH—hours in twenty four hour notation
  MI—minutes
  SS—seconds
  F"—n number of fractions
The default format is "YYYY-MM-DD:HH:MI:SS.FFF" For example:
  dyntxrule.timestamp.format=YYYY-MM-DD-HH.MI.SS
{txrule}.seqid
 Determines the seqid for a particular transaction. This can be used when there are multiple transactions per message. Determines the XPath expression, JMS property, or system value that contains the transactions seqid. Any XPath expression must end with a value accessor such as @att of text( ).
  {txrule}.seqid={xpath-expression}|${jms-property}|*seqid
For example:
  dyntxrule.seqid=@seqid
{txrule}.txid
 Determines the XPath expression, JMS property, or system value that contains the txid used to unique identify transactions. This value must be continually increasing for each transaction.
  {txrule}.txid={xpath-expression}|${jms-property}|*txid
For most cases using the system value of *txid is preferred.
For example:

```
dyntxrule.txid=$JMSTxId
dyntxrule.txid=*txid
```

{txrule}.txowner
 Optionally, determines the XPath expression, JMS property, or static value that contains an arbitrary user name associated with a transaction. This value may be used to exclude certain transactions from processing
  {txrule}.txowner={xpath-expression}|${jms-property}|"{value}"
For example:
  dyntxrule.txowner=$MessageOwner
  dyntxrule.txowner="jsmith"
{txrule}.txname
 Optionally, determines the XPath expression, JMS property, or static value that contains an arbitrary name to be associated with a transaction
  {txrule}.txname={xpath-expression}|${jms-property}|"value"
For example:
  dyntxrule.txname="fixedtx"
{oprule}.timestamp
 Optionally determines the XPath expression or JMS property that contains the operation commit timestamp, or to use the current system time.
  {oprule}.timestamp={xpath-expression}|${jms-property}|*ts The timestamp for the operation may override a timestamp at the transaction level. Any XPath expression must end with a value accessor such as @att of text( ). For example:
    statoprule.timestamp=./CreateTime/text( )
{oprule}.timestamp.format
    Determines the format of the timestamp field.
        {oprule}.timestamp.format={format}
where the format can include punctuation characters plus:
    YYYY—four digit year
    YY—two digit year
    M[M]—one or two digit month
    D[D]—one or two digit day
    HH—hours in twenty four hour notation
    MI—minutes
    SS—seconds
    F"—n number of fractions
The default format is "YYYY-MM-DD:HH:MI:SS.FFF" For example:
    statoprule.timestamp.format=YYYY-MM-DD-HH.MI.SS
{oprule}.seqid
    Optionally overrides any seqid defined in parent transaction rules. Must be present if there is no parent transaction rule. Determines the seqid for a particular operation. Determines the XPath expression, JMS property, or system value that contains the operations seqid. Any XPath expression must end with a value accessor such as @att of text( ).
        {oprule}.seqid={xpath-expression}|${jms-property}|*seqid
For example:
    dynoprule.seqid=@seqid
{oprule}.txid
    Optionally overrides any txid defined in parent transaction rules. Must be present if there is no parent transaction rule. Determines the XPath expression, JMS property, or system value that contains the txid used to unique identify transactions. This value must be continually increasing for each transaction.
        {oprule}.txid={xpath-expression}|${jms-property}|*txid
For most cases using the system value of *txid is preferred. For example:

```
dynoprule.txid=$JMSTxId
dynoprule.txid=*txid
```

{oprule}.txowner
    Optionally, determines the XPath expression, JMS property, or static value that contains an arbitrary user name associated with a transaction. This value may be used to exclude certain transactions from processing
        {oprule}.txowner={xpath-expression}|${jms-property}|"{value}"
For example:

```
dynoprule.txowner=$MessageOwner
dynoprule.txowner="jsmith"
```

{oprule}.txname
    Optionally, determines the XPath expression, JMS property, or static value that contains an arbitrary name to be associated with a transaction
        {oprule}.txname={xpath-expression}|${jms-property}|"value"

For example:
    dynoprule.txname="fixedtx"
{oprule}.schemandtable
    Determines the XPath expression JMS property or hard-coded value that contains the schema and table name in the form SCHEMA.TABLE. Any XPath expression must end with a value accessor such as @att ot text( ). Verified to ensure the table exists in source defs.
        {oprule}.schemaandtable={xpath-expression}|${jms-property}|"value"
For example:
    statoprule.schemaandtable="MY.TABLE"
{oprule}.schema
    Determines the XPath expression, JMS property or hard-coded value that contains the schema name. Any XPath expression must end with a value accessor such as @att ot text( ).
        {oprule}.schema={xpath-expression}|${jms-property}|"value"
For example:
    statoprule. schema=@schema
{oprule}.table
    Determines the XPath expression, JMS property or hard-coded value that contains the table name. Any XPath expression must end with a value accessor such as @att ot text( ).
        {oprule}.table={xpath-expression}|${jms-property}|"value"
For example:
    statoprule.table=$TableName
{oprule}.optype
    Determines the XPath expression, JMS property or hard-coded value that contains the optype to be validated against an optype insertval, etc. Any XPath expression must end with a value accessor such as @att of text( ).
        {oprule}.optype={xpath-expression}|${jms-property}|"value"
For example:

```
dynoprule.optype=@type
statoprule.optype="I"
```

{oprule}.optype.insertval
    The value to look for to identify an operation as an Insert type operation. The default is 'I'.
        {oprule}.optype.insertval={value}|\x{hex-value}
For example:
    dynoprule.optype.insertval=A
{oprule}.optype.updateval
    The value to look for to identify an operation as an Update type operation. The default is 'U'.
        {oprule}.optype.updateval={value}|\x{hex-value}
For example:
    dynoprule.optype.updateval=M
{oprule}.optype.deleteval
    The value to look for to identify an operation as a Delete type operation. The default is 'D'.
        {oprule}.optype.deleteval={value}|\x{hex-value}
For example:
    dynoprule.optype.deleteval=R
{oprule}.txind
    Optionally determines the XPath expression or JMS property that contains the transaction indicator to be validated against beginval etc. If not defined all operations within a single message will be seen to have occurred within a whole transaction. If defined, then will determine the begin, middle and end of transactions. Any XPath expression must end with a value accessor such as @att of text( ). Transactions defined in this way can span messages.

{oprule}.txind={xpath-expression}|${jms-property}
For example:
dynoprule.txind=@txind
{oprule}.txind.beginval
The value to look for to identify an operation as the beginning of a transaction. Defaults to 'B'.
{oprule}.txind.beginval={value}|\x{hex-value}
For example:
dynoprule.txind.beginval=0
{oprule}.txind.middleval
The value to look for to identify an operation as the middle of a transaction. Defaults to 'M'.
{oprule}.txind.middleval={value}|\x{hex-value}
For example:
dynoprule.txind.middleval=1
{oprule}.txind.endval
The value to look for to identify an operation as the end of a transaction. Defaults to 'E'.
{oprule}.txind.endval={value}|\x{hex-value}
For example:
dynoprule.txind.endval=2
{oprule}.txind.wholeval
The value to look for to identify an operation as a whole transaction. Defaults to 'W'.
{oprule}.txind.wholeval={value}|\x{hex-value}
For example:
dynoprule.txind.wholeval=3
{colrule}.name
Determines the XPath expression or hard-coded value that contains a column name. If not specified then the column index must be specified and the column name will be resolved from that. If specified the column name will be verified against the source definitions file. Any XPath expression must end with a value accessor such as @att ot text( ).
{colrule}.name={xpath-expression}|"value"
For example:

```
dyncolrule.name=@name
statkeycolrule.name="keycol"
```

{colrule}.index
Determines the XPath expression or hard-coded value that contains a column index. If not specified then the column name must be specified and the column index will be resolved from that. If specified the column index will be verified against the source definitions file. Any XPath expression must end with a value accessor such as @att ot text( ).
{colrule}.index={xpath-expression}|"value"
For example:

```
dyncolrule.index=@index
statkeycolrule.index=1
```

{colrule}.value
Determines the XPath expression or hard-coded value that contains a column value. Any XPath expression must end with a value accessor such as @att ot text( ). If the XPath expression fails to return any data because a node or attribute does not exist, the column value will be deemed as null. To differentiate between null and missing values (for updates) the isnull and is missing properties should be set. The value returned is used for delete before values, and update/insert after values.
{colrule}.value={xpath-expression}|"value"
For example:
statkeycolrule.value=./text( )
{colrule}.isnull
Optionally determines the XPath expression used to discover if a column value is null. The XPath expression must end with a value accessor such as @att ot text( ). If the XPath expression returns any value, then the column value is null.
{colrule}.isnull={xpath-expression}
For example:
dyncolrule.isnull=@isnull
{colrule}.ismissing
Optionally determines the XPath expression used to discover if a column value is missing. The XPath expression must end with a value accessor such as @att ot text( ). If the XPath expression returns any value, then the column value is missing.
{colrule}.ismissing={xpath-expression}
For example:
dyncolrule.ismissing=./missing
{colrule}.before.value
Optionally override {colrule}.value to specifically say how to obtain before values used for updates or deletes. Has the same format as {colrule}.value. For example:
dyncolrule.before.value=./beforevalue/text( )
{colrule}.before.isnull
Optionally override {colrule}.isnull to specifically say how to determine if a before value is null for updates or deletes. Has the same format as {colrule}.isnull. For example:
dyncolrule.before.isnull=./beforevalue/@isnull
{colrule}.before.ismissing
Optionally override {colrule}.ismissing to specifically say how to determine if a before value is missing for updates or deletes. Has the same format as {colrule}.ismissing. For example:
dyncolrule.before.ismissing=./beforevalue/missing
{colrule}.after.value
As per {colrule}.before.value except for after values.
{colrule}.after.isnull
As per {colrule}.before.isnull except for after values.
{colrule}.after.ismissing
As per {colrule}.before.ismissing except for after values.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for performing real-time conversion of data present in the form of messages into database transactions which can subsequently be applied to a database, comprising:
a computer including a microprocessor; and
a messaging capture adaptor, which includes
a messaging connectivity component that reads messages from a message queue at a first or source system, and
a data parsing component that parses data within the messages, from a source format of the first or source system, to a target format of a target database or second system;
wherein the messaging capture adaptor
starts a local transaction,
retrieves the messages from the message queue at the first or source system,
processes data within the messages, according to a set of properties, rules and other messaging connectivity information that define how the messages should be parsed and mapped to records in the target database or second system,
generates a trail file containing the processed data, for use in applying the processed data as database operations to the target database or second system, and
commits the local transaction.

2. The system of claim 1, wherein the message queue is a Java Message Service (JMS) queue and the messages are JMS messages.

3. The system of claim 1, wherein the messaging capture adaptor communicates with an extract process to generate the trail file.

4. The system of claim 1, wherein the messaging capture adaptor includes the set of properties, rules and other messaging connectivity information that define how the messages received at the first or source system should be parsed and mapped to records in the target database or second system, to create the trail file.

5. The system of claim 4, wherein the messaging capture adaptor comprises a vendor access module or communications component or interface.

6. The system of claim 1, wherein the messaging capture adaptor operates to request messages from a designated queue at the first or source system by
starting a local messaging service transaction if not already started,
reading a message off the designated queue, and
if a message exists, then returning the contents of the message and any message header properties to the messaging capture adaptor.

7. The system of claim 6, wherein,
if the messaging capture adaptor has successfully parsed the message, has output an entire transaction to the trail, and has ensured the transaction has been flushed to disk, the local messaging service transaction is then committed, removing the messages from the queue or topic at the first or source system, and
in the event of an error, the local messaging service transaction is rolled back, leaving the message unprocessed at the first or source system.

8. The system of claim 1, wherein the messaging capture adaptor supports any one or more of fixed width message parsing, delimited message parsing, or XML message parsing.

9. A method for performing real-time conversion of data present in the form of messages into database transactions which can subsequently be applied to a database, comprising the steps of:
providing a messaging capture adaptor, which includes
a messaging connectivity component that reads messages from a message queue at a first or source system, and
a data parsing component that parses data within the messages, from a source format of the first or source system, to a target format of a target database or second system;
wherein the messaging capture adaptor
starts a local transaction,
retrieves the messages from the message queue at the first or source system,
processes data within the messages, according to a set of properties, rules and other messaging connectivity information that define how the messages should be parsed and mapped to records in the target database or second system,
generates a trail file containing the processed data, for use in applying the processed data as database operations to the target database or second system, and
commits the local transaction.

10. The method of claim 9, wherein the message queue is a Java Message Service (JMS) queue and the messages are JMS messages.

11. The method of claim 9, wherein the messaging capture adaptor communicates with an extract process to generate the trail file.

12. The method of claim 9, wherein the messaging capture adaptor includes the set of properties, rules and other messaging connectivity information that define how the messages received at the first or source system should be parsed and mapped to records in the target database or second system, to create the trail file.

13. The method of claim 12, wherein the messaging capture adaptor comprises a vendor access module or communications component or interface.

14. The method of claim 9, wherein the messaging capture adaptor operates to request messages from a designated queue at the first or source system by
starting a local messaging service transaction if not already started,
reading a message off the designated queue, and
if a message exists, then returning the contents of the message and any message header properties to the messaging capture adaptor.

15. The method of claim 14, wherein,
if the messaging capture adaptor has successfully parsed the message, has output an entire transaction to the trail, and has ensured the transaction has been flushed to disk, the local messaging service transaction is then committed, removing the messages from the queue or topic at the first or source system, and in the event of an error, the local messaging service transaction is rolled back, leaving the message unprocessed at the first or source system.

16. The method of claim 9, wherein the messaging capture adaptor supports any one or more of fixed width message parsing, delimited message parsing, or XML message parsing.

17. A non-transitory computer readable medium, including instructions stored thereon which when read and executed by a computer cause the computer to perform the steps comprising:
   providing a messaging capture adaptor, which includes
      a messaging connectivity component that reads messages from a message queue at a first or source system, and
      a data parsing component that parses data within the messages, from a source format of the first or source system, to a target format of a target database or second system;
   wherein the messaging capture adaptor
      starts a local transaction,
      retrieves the messages from the message queue at the first or source system,
      processes data within the messages, according to a set of properties, rules and other messaging connectivity information that define how the messages should be parsed and mapped to records in the target database or second system,
      generates a trail file containing the processed data, for use in applying the processed data as database operations to the target database or second system, and
      commits the local transaction.

* * * * *

UNITED STATES PATENT AND TRADEMARK OFFICE
CERTIFICATE OF CORRECTION

PATENT NO. : 8,626,778 B2
APPLICATION NO. : 13/076253
DATED : January 7, 2014
INVENTOR(S) : Wilkes et al.

Page 1 of 2

It is certified that error appears in the above-identified patent and that said Letters Patent is hereby corrected as shown below:

In the Drawings

On sheet 3 of 3, in figure 3, under Reference Numeral 170, line 1, delete "Mess aging" and insert -- Messaging --, therefor.

On sheet 3 of 3, in figure 3, under Reference Numeral 172, line 1, delete "Retr ieve," and insert -- Retrieve, --, therefor.

On sheet 3 of 3, in figure 3, under Reference Numeral 174, line 1, delete "reques ts" and insert -- requests --, therefor.

On sheet 3 of 3, in figure 3, under Reference Numeral 176, line 1, delete "corresp onding" and insert -- corresponding --, therefor.

On sheet 3 of 3, in figure 3, under Reference Numeral 176, line 2, delete "cre ating" and insert -- creating --, therefor.

On sheet 3 of 3, in figure 3, under Reference Numeral 178, line 2, delete "Queu e" and insert -- Queue --, therefor.

On sheet 3 of 3, in figure 3, under Reference Numeral 180, line 1, delete ""pumped"" and insert -- "pumped" --, therefor.

On sheet 3 of 3, in figure 3, under Reference Numeral 180, line 2, delete "Ta rget" and insert -- Target --, therefor.

Signed and Sealed this
Thirtieth Day of June, 2015

Michelle K. Lee
*Director of the United States Patent and Trademark Office*

CERTIFICATE OF CORRECTION (continued)
U.S. Pat. No. 8,626,778 B2

In the Specification

In column 5, line 24, delete ""pumped"" and insert -- "pumped" --, therefor.

In column 27, line 38, delete "stattxtule" and insert -- stattxrule --, therefor.

In column 32, line 1, delete "is missing" and insert -- ismissing --, therefor.